(12) United States Patent
Barbir

(10) Patent No.: US 6,393,125 B1
(45) Date of Patent: May 21, 2002

(54) INITIALIZER FOR A CONFUSION DATA GENERATOR

(75) Inventor: Abdulkader Omar Barbir, Nepean (CA)

(73) Assignee: Zarlink Semiconductor Inc., Kanata, Ontario (CA)

( * ) Notice: Subject to any disclaimer, the term of this patent is extended or adjusted under 35 U.S.C. 154(b) by 0 days.

(21) Appl. No.: 09/113,187

(22) Filed: Jul. 10, 1998

(30) Foreign Application Priority Data

Jul. 11, 1997 (CA) .............................................. 2210199

(51) Int. Cl.⁷ .............................................. G06F 11/30
(52) U.S. Cl. .............................. 380/22; 380/42; 380/43
(58) Field of Search ............................. 380/22, 42, 43, 380/28, 264, 45, 46, 268

(56) References Cited

U.S. PATENT DOCUMENTS

| | | | |
|---|---|---|---|
| 4,316,055 A | * 2/1982 | feistel | 380/37 |
| 4,471,164 A | * 9/1984 | Henry | 380/30 |
| 4,815,130 A | * 3/1989 | Lee et al. | 380/265 |
| 4,979,832 A | * 12/1990 | Ritter | 380/28 |
| 5,245,339 A | 9/1993 | Cideciyan | |
| 5,276,738 A | 1/1994 | Hirsch | |
| 5,345,507 A | * 9/1994 | Herzberg et al. | 380/28 |
| 5,351,300 A | 9/1994 | Quisquater et al. | |
| 5,365,588 A | * 11/1994 | Bianco et al. | 380/40 |
| 5,390,321 A | 2/1995 | Proesel | |
| 5,428,686 A | * 6/1995 | Brown et al. | 380/46 |
| 5,440,640 A | * 8/1995 | Anshel et al. | 380/46 |
| 5,703,952 A | * 12/1997 | Taylor | 380/44 |
| 5,727,062 A | 3/1998 | Ritter | |
| 5,774,738 A | 6/1998 | Hillan | |
| 5,835,597 A | * 11/1998 | Coppersmith et al. | 380/28 |
| 5,878,424 A | 3/1999 | Dooling et al. | |
| 5,983,252 A | 11/1999 | Clapp | |
| 5,999,895 A | 12/1999 | Forest | |
| 6,122,379 A | * 9/2000 | Barbir | 380/269 |

FOREIGN PATENT DOCUMENTS

| | | |
|---|---|---|
| EP | 658022 A2 | 6/1995 |
| EP | 667691 A2 | 8/1995 |
| EP | 725511 A2 | 8/1996 |
| WO | WO 94/16509 | 7/1994 |
| WO | WO 95/10148 | 4/1995 |
| WO | 9800949 | 1/1998 |
| WO | 9805142 | 2/1998 |

* cited by examiner

Primary Examiner—Thomas R. Peeso
(74) Attorney, Agent, or Firm—Miles & Stockbridge P.C.; Edward J. Kondracki

(57) ABSTRACT

A method and apparatus for the initialization of a class of non-linear confusion data generators is especially useful to enhance the security of non-linear confusion data generators that are restricted to short size secret keys or seeds. The initializer utilizes a user seed and a displacement distance to single or multiple secret key and cipher arrays to randomize confusion data generators such that their security is enhanced. The initializer provides the ability to design confusion data generators that are capable of securing large size data files as a collection of smaller size segments that can be independently decrypted for fast access and review. The initializer can be used to securely store data on a storage medium or transmit data over a communication medium.

6 Claims, 6 Drawing Sheets

INITIALIZER FOR A CONFUSION DATA GENERATOR

FIELD OF INVENTION

The present invention relates to a method and apparatus for the initialization of a class of non-linear confusion data generators to enhance the security of an encryption system.

BACKGROUND OF THE INVENTION

In this application, the phrases "application of data to a medium" or "applying data to a medium" refer to the act of putting the data on a communication medium or mediums, or a storage medium or mediums. This involves the act of generating physical signals (i.e. electrical, electromagnetic, light, or other) which are sent (for a communication medium) or stored (for a storage medium).

Whether data is transmitted or stored, it is susceptible to unauthorized observation. Security is becoming particularly difficult as computers are increasingly networked, thus increasing potential access to stored or transmitted confidential data. Therefore, to transmit or store data in a secure fashion, the data must be encrypted.

One of the main objectives of the field of data encryption is to transform plaintext data into ciphertext data in a way to conceal the information content of the original data. For the transformation to be of any value, it should be reversible, meaning that an inverse transformation should exist that enables the user to obtain the original plaintext from the ciphertext (i.e. decryption). In general, the process involves the use of a secret key or seed in the encryption and decryption phases.

There are many encryption techniques that can be used to transfer plaintext into ciphertext. Such techniques generally utilize block ciphers, substitution ciphers, stream ciphers or random number generators. However, due to the ease of their implementation in software and hardware, stream ciphers have gained popularity as fast encryptor devices. Hence, many popular encryption techniques are based on stream ciphers.

In general, a stream cipher combines plaintext data with pseudo-random confusion data to produce ciphertext data. Hence, a stream cipher can be thought off as a confusion data generator and a combiner. An important combiner is based on the binary bit-by-bit addition mod 2, which is also known as the Boolean logic exclusive-OR (XOR) function. Hence, the confusion data would be combined with the plaintext data by using the XOR function in order to encrypt the plaintext.

The task of XORing the plaintext with random bytes generally results in the generation of random bytes. It also helps to disguise the frequency statistics of the plaintext data. In the decryption process, the same confusion data would be XORed with the ciphertext data in order to recover the original plaintext. Hence, the use of the XOR function as a combiner results in a simple decrypting process.

The design of ciphers must assume that the cipher must be able to confront an unauthorized attacker who seeks the information contained in the ciphertext. Plaintext attacks are an example of the type of assault that could be used by a cryptanalyst. Plaintext attacks capitalize on the weakness of the XOR combiner to enable an unauthorized cryptanalyst to recover a portion of the confusion data. In the worst case scenario, the cryptanalyst could analyse the confusion data and manages to reproduce the pseudo-random source, thus making the decryption of all subsequent messages possible.

The above limitation forces the designer to concentrate on developing confusion data generators or random number generators which would be exceedingly difficult for a cryptanalyst to analyse fully.

For applications that are restricted to short length secret keys, the cryptanalyst might try to guess the secret key through the use of exhaustive key search techniques. Here, the cryptanalyst would simply try to generate all possible keys in order to replicate the confusion data. Current advances in computer technology provides the cryptanalyst the ability to perform such a task in a relatively short time. Hence, the restriction on the length of the secret key increases the need for confusion data generators that can withstand the exhaustive key search attack.

Another limitation of the current design techniques of stream ciphers is related to the fact that the cipher generates a continuous stream of bits that are used to encrypt the plaintext. The generation of the continuous stream of cipher bits complicates the task of decrypting large size data files. This is because if only the last segment of a large data file must be accessed, the whole cipher stream must be generated before that segment can be reviewed. This major drawback limits the effective use of stream ciphers in applications that are, for example, based on randomly accessing a portion of large files that must be securely stored.

SUMMARY OF THE INVENTION

A first object of the present invention is to provide an improved initializer for a confusion data generator.

A second object of the invention is to develop a method and apparatus that enhances on the security of confusion data generators especially when used with applications that are restricted to short length seeds or keys.

A third object of the invention is to provide a method and apparatus for generating confusion data that can be used to secure large size data plaintext files as a collection of smaller size segments that can be independently accessed for decryption and review.

The invention is especially useful to enhance the security of non-linear confusion data generators that are restricted to short size secret keys or seeds. The initializer utilizes a user seed and a displacement distance to single or multiple secret key and cipher arrays to randomize confusion data generators such that their security is enhanced. The initializer provides the ability to design confusion data generators that are capable of securing large size data files as a collection of smaller size segments that can be independently decrypted for fast access and review. The initializer can be used to securely store data on a storage medium or transmit data over a communication medium.

According to the invention, there is provided an initializer for a confusion data generator, comprising: a first key array comprising a series of data elements, each data element having a value; a first key displacement index having a value corresponding to a data element in the first array; a second key array comprising a series of data elements, each data element having a value; a first cipher array comprising a series of data elements, each data element having a value; a first index having a value corresponding to a data element in the first cipher array; and means for initializing the first key array with a user specified seed as a function of the first displacement index.

According to the invention, there is further provided an apparatus for encrypting data comprising: (a) means for initializing a confusion data generator; (b) means for generating a segment of confusion data; (c) means for combining the segment of confusion data and a segment of data with a combiner to create a segment of encrypted data; and (d) means for re-initializing the confusion data generator.

According to the invention, there is further provided a method for initializing a confusion data generator with an initializer comprising: a first key array comprising a series of data elements, each data element having a value; a first key displacement index having a value corresponding to a data element in the first array; a second key array comprising a series of data elements, each data element having a value; a first cipher array comprising a series of data elements, each data element having a value; a first index having a value corresponding to a data element in the first cipher array; the method comprising the step of initializing the first key array with a user specified seed as a function of the first displacement index.

According to the invention, there is further provided a method for encrypting data comprising the steps of: (a) initializing a confusion data generator; (b) generating a segment of confusion data; (c) combining the segment of confusion data and a segment of data with a combiner to create a segment of encrypted data; (d) re-initializing the confusion data generator; and (e) repeating steps (a) to (d) for the remaining data.

The invention presents a method and apparatus for the initialization of a family of confusion data generators (CDG) that permits the generation of a highly non-linear or complex cipher bit stream that could be used to securely store data on a storage medium or transmit data over a communication medium. The present invention allows the development of scalable confusion data generators that could be implemented more efficiently in hardware and software to minimize development costs.

The invention enables the design of confusion data generators that have better security for applications that are restricted to short length secret key. Furthermore, the invention provides the designer with the ability to secure large size data files as a collection of smaller size segments that could be independently decrypted for fast access and review.

Other advantages, objects and features of the present invention will be readily apparent to those skilled in the art from a review of the following detailed description of preferred embodiments in conjunction with the accompanying drawings and claims.

BRIEF DESCRIPTION OF THE DRAWINGS

The embodiments of the invention will now be described with reference to the accompanying drawings, in which.

Similar references are used in different figures to denote similar components.

DETAILED DESCRIPTION OF THE INVENTION

The following is a description of preferred embodiments of the present invention. The embodiments employ a system that performs data encryption and data decryption based on an encryption key or a seed. The system introduces randomness into the data such that it can only be decrypted by a system that uses the same confusion data generator and the same key.

Figure 1:
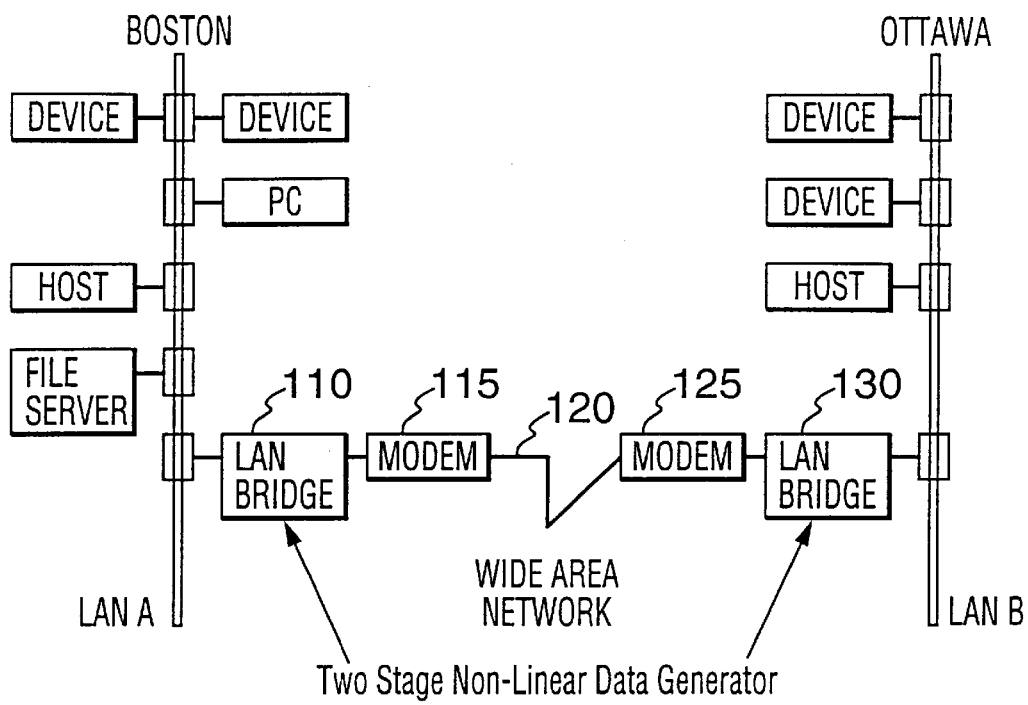
FIG. 1 is a block diagram of a Local Area Network (LAN) to LAN communication network over a Wide Area Network (WAN) link.

Referring to FIG. 1, a pair of Local Area Networks (LANs), namely LAN A and LAN B, are shown. LAN A is located in Boston, and LAN B is located in Ottawa. Each LAN has attached thereto various devices which are well known in the art. In general for security purposes, there may be a need for data encryption within each of LAN A and LAN B.

However, there is a greater need to encrypt the data during its transport from LAN A to LAN B over the unprotected public network. Hence, when data is transmitted from LAN A to LAN B, it will pass through LANBRIDGE 110 processor, where the user portion of the data packets appearing on LAN A is encrypted in accordance with the teachings of the present invention. The data is then transmitted by modem 115 over Wide Area Network (WAN) link 120 to modem 125. The received user data packets are then decrypted by LANBRIDGE 130 and the packets appearing at the input to LANBRIDGE 130 are reconstructed and placed on LAN B.

Figure 2:
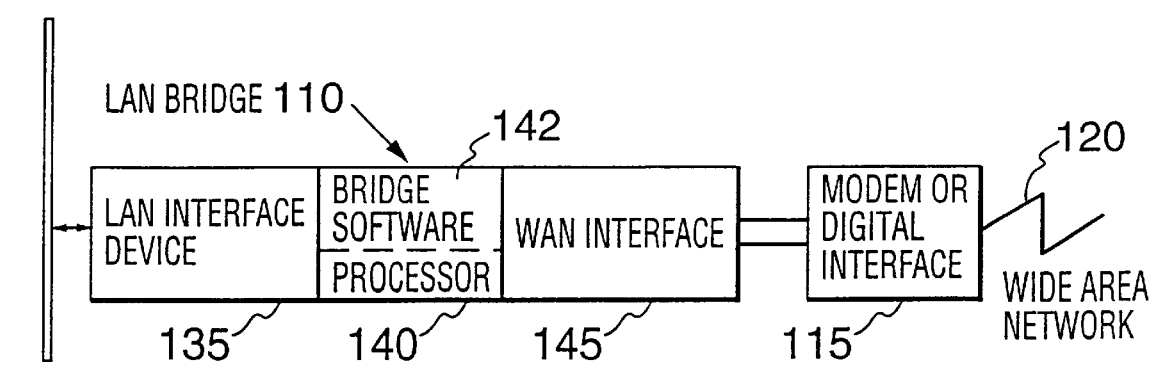
FIG. 2 is a block diagram of the main processor of FIG. 2.

In FIG. 2, a block diagram of LANBRIDGE 110 is shown. Data packets appearing on LAN A are received by LAN interface device 135 and passed into LANBRIDGE 110 processor 140. Within the processor 140 is bridge software 142 which, in addition to performing routing and other functions, also performs data encryption and decryption on the data portion of the packets.

Figure 3:
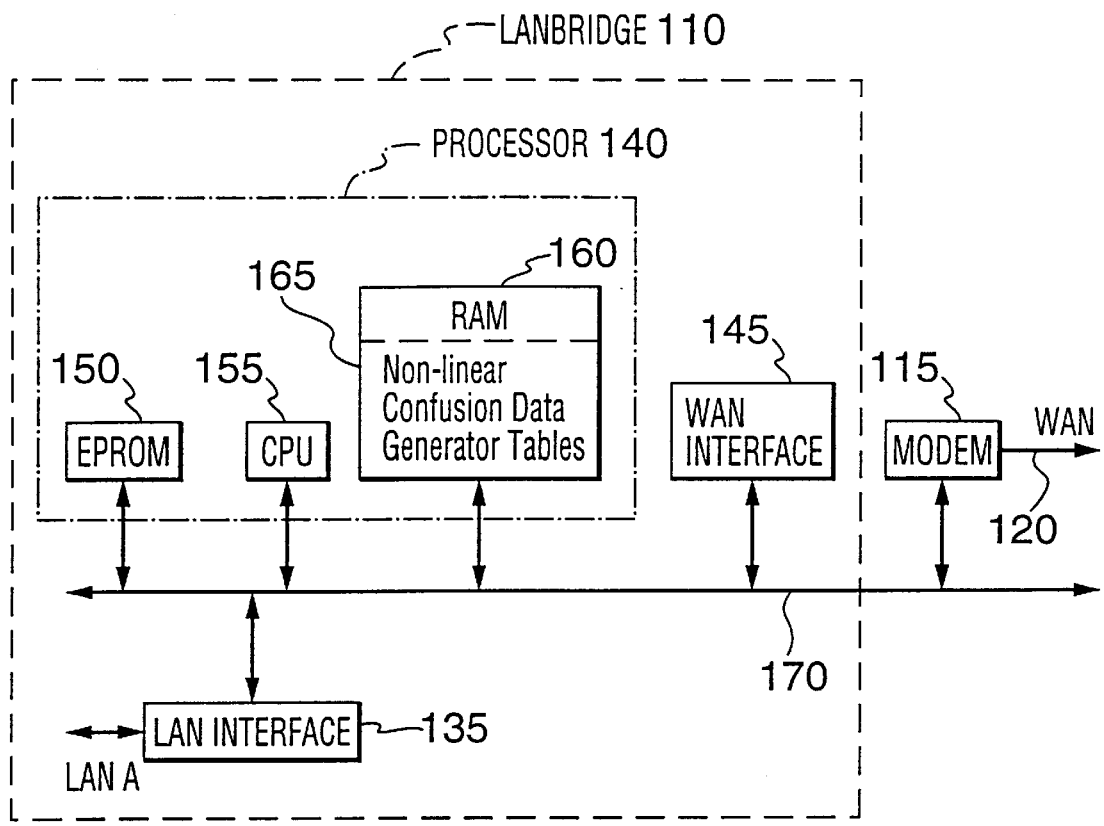
FIG. 3 is a block diagram showing major hardware components of the processor of FIG. 3.

A high level block diagram of LANBRIDGE 110 processor is shown in FIG. 3. A central processing unit (CPU) 155 forms the heart of LANBRIDGE 110. The CPU 155 communicates with other elements of the system via bus 170. The LAN interface 135 is connected to its bus 170, as is WAN interface 145 which provides a gateway for data to and from modem 115. An electrically alterable programmable read only memory (EPROM) 150 and random access memory (RAM) 160 provide storage functions for CPU 155. Within RAM 160 are tables 165 that are employed by the encryption software 142. In FIG. 3, the processor 140 includes EPROM 150, CPU 155 and RAM 160. Alternatively, the CPU may be any special hardware device.

Before introducing the confusion data generator (CDG) as developed in this invention, it is beneficial to introduce some basic notations. In particular, we make reference of the use of the mathematical modulo operation (mod), which gives the remainder of dividing one number by the other. The term exchange means that the contents of two data variables is interchanged. The term array is used in the context of the C programming language which indicates a set of elements having the same data type that could be referenced by indexing them. Hence, an array R is a one dimensional entity of certain size or dimension, such as 'b', with elements assuming locations zero to 'b−1'. In this invention an array is viewed as a state machine that could transform from one state to another. The order of elements in an array defines the state of the array at a given time. Hence, if two elements of an array are exchanged, then the state of the array is changed, since the new order of elements in the array is different from the old order of elements in the array.

To help illustrate the initialization process of this invention it is beneficial to introduce a confusion data generator that could benefit from the methodology of the present invention. In this regard, consider a confusion data generator that uses a plurality of arrays acting as non-linear state machines to generate the confusion data. These arrays are termed cipher arrays. The next state of a cipher array is determined as a function of its present state and the states of the rest of the cipher arrays. The transition process is determined in a non-linear fashion based on the mathematical concept of randomization by non-linear exchange. The initialization of the cipher arrays is performed as a function of all the cipher arrays and a secret key array. The secret key array holds the user seed.

The designer of the confusion data generator specifies the total width 'm' in bits of the confusion data, the number of cipher arrays 'n', the width 'w' of random bits and the dimension of each of the cipher arrays that are used in the design. For the following analysis, and without limiting the generality of the foregoing, it is assumed that the dimension of each cipher arrays is an integral power of two and that the width 'm' of the confusion data is a multiple of two.

Before the confusion data of this invention is used, a three step setup process is performed. The first step of the initialization process consists of setting up the secret key array. In this step, the user seed is used to initialize each location in the secret key array. This is done by replicating the user seed to fill all the locations in the secret key array.

The second step of the setup process consists of filling the cipher arrays with data elements whose values are unique. The simplest way to achieve this objective is to fill each cipher array with data that range from zero to 'c−1', where 'c' is the dimension of the cipher arrays.

For example, let the width of the confusion data in bits be 'm'=24, and let the number of cipher arrays that are used in the design of the confusion data generator be 'n'=3. Hence, each cipher array must generate 8 bits of random data per iteration. Thus, the dimension of each cipher array is 'c'=8.

Let Array_1, Array_2 and Array_3 be the three cipher arrays that would be used in the design of the confusion data generator. Furthermore, let the secret key array be Key whose dimension is the same as the dimension of each of the cipher arrays and is equal to 'c'=8.

Figure 4:
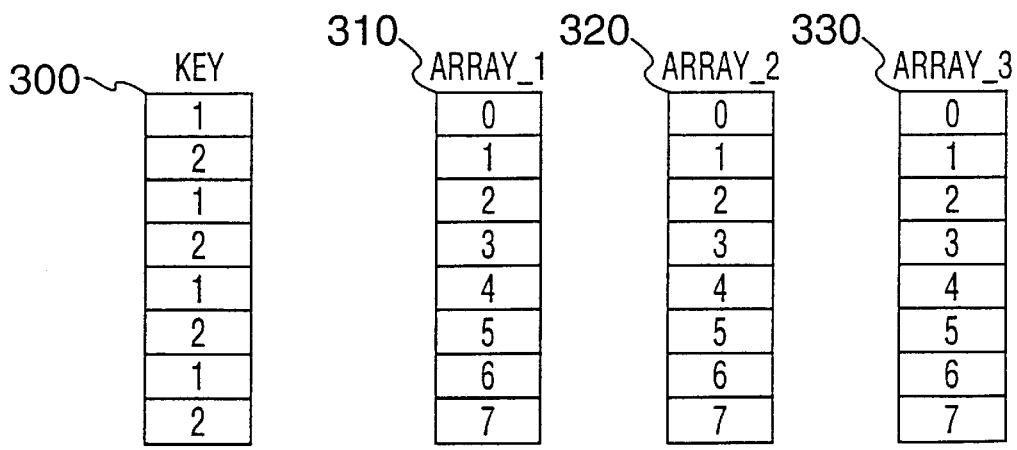
FIG. 4 is a block diagram of step 1 of the setup sequence of the method applied by the processor of FIG. 3.

In FIG. 4, the details of initializing the secret key array and the cipher arrays are depicted. In step 300, the secret array Key is initialized with the user seed starting at location zero. The seed is replicated to fill all the locations in the array. In step 310, the cipher array Array_1 is filled with data elements starting at location zero. In step 320 and 330, the same process is repeated to cipher array Array_2 and Array_3.

Figure 5:
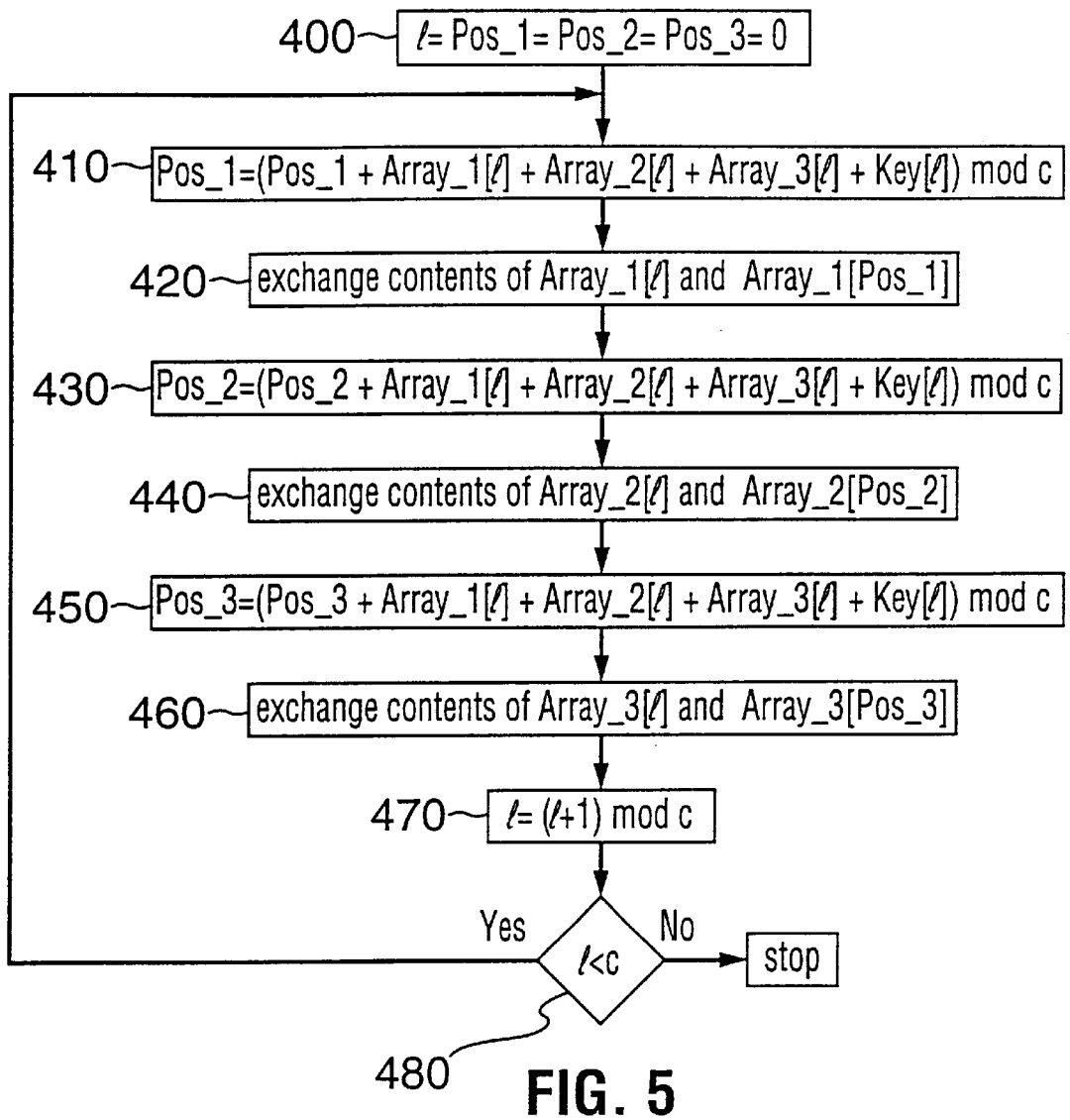
FIG. 5 is a block diagram of step 2 of the setup sequence of the method applied by the processor of FIG. 3.

The third step in the setup process consists of shuffling the contents of the cipher arrays as a function of the secret key array in a non-linear fashion. This step uses the mathematical modulo operation 'mod'. In FIG. 5, the details of the non-linear shuffling operation are depicted. In the Figure, steps 470 and 480 ensure that all the elements of the cipher arrays are shuffled. In step 400, the variables '1', 'pos_', 'pos_2' and 'pos_3' are initialized to zero. The variable '1' indicates the current location within the cipher array that must be shuffled. Variables 'pos_', 'pos_2' and 'pos_3' are computed in a non-linear fashion and point to the location within a cipher array that must be exchanged with the '1'th location. In step 410, the new value of 'pos_1' is computed as a function 'Key[1]', 'Array_[1]', 'Array_2[1]', 'Array_3[1]' and itself modulo 'c', where 'c' is the dimension of the cipher array. In step 420, the element s in location '1' and 'pos_1' in Array_are exchanged. The same processing is performed on the elements of Array_2 and Array_3 in steps 430, 440, 450 and 460.

Figure 6:
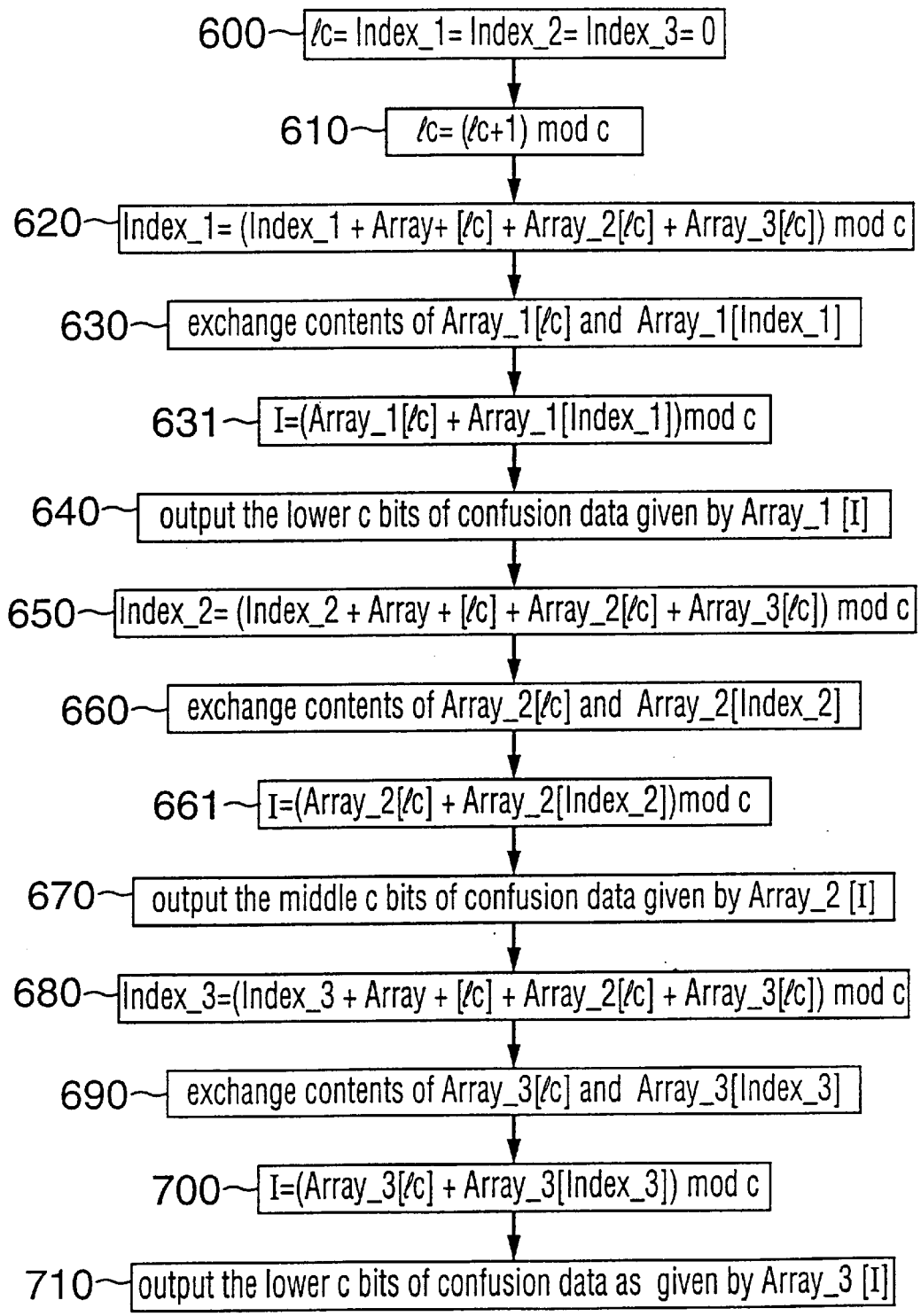
FIG. 6 is a block diagram of the confusion data generator of the method applied by the processor of FIG. 3.

In FIG. 6, the details of the actual generation of the confusion data are depicted. In step 600, the variables 'LC', 'Index_1', 'Index_2' and 'Index_3' are initialized to zero. Here, 'LC' acts as a data counter, it basically counts the number of data items that have been processed. The variables 'Index_1', 'Index_2' and 'Index_3' are used as indices to Array_ 1, Array_2 and Array_3, whereby, the location that they point to is exchanged with location 'LC' in preparation for the next output sequence of the confusion data. In the example of FIG. 6, 'Index_1' is used to compute the lower 'c' bits of the confusion data. 'Index_2' is used to compute the middle 'c' bits of the confusion data and 'Index_3' is used to compute the upper 'c' bits of the confusion data. The order of the indices can vary from one application to another and is user specified. In step 610, 'LC' is incremented to indicate that one piece of data is processed. The process is performed as a modulo 'c' operation. In step 620, the new value of 'Index_1' is computed as a modulo 'c' operation consisting of the previous value of 'Index_1', the 'LC' position of Array_1, Array_2, and Array_3. In step 630, the 'LC' element and the 'Index_1' element of Array_1 are exchanged. In step 631, the index of the lower 'c' bits of the confusion data is computed and stored in the variable 'I'. Here 'I' is computed as a modulo 'c' operation of the addition of 'Array_1[Index_1]' and 'Array_1[LC]'. In step 640, the lower 'c' bits of confusion data are generated by outputting the Ith location of Array_1.

In step 650, the new value of 'Index_2' is computed as a modulo 'c' operation consisting of the previous value of 'Index_2', the 'LC' position of Array_1, Array_2 and Array_3. In step 660, the 'Index_2' elements and the 'LC' location of Array_2 are exchanged. In step 661, the index of the middle 'c' bits of the confusion data is computed and stored in the variable 'I'. Here 'I' is computed as a modulo 'c' operation of the addition of 'Array_2[Index_2]' and 'Array_2[LC]'. In step 670, the middle 'c' bits of confusion data are generated by outputting the Ith location of Array_2.

In step 680, the new value of Index_3 is computed as a modulo 'c' operation consisting of the previous value of 'Index_3' the 'LC' position of Array_1, Array_2 and Array_3. In step 690, the 'Index_3' elements and the 'LC' element of Array_3 are exchanged. In step 700, the index of the upper 'c' bits of the confusion data is computed and stored in the variable 'I'. Here 'I' is computed as a modulo 'c' operation of the addition of 'Array_3[Index 3]' and 'Array_3[LC]'.

In step 710, the upper 'c' bits of the confusion data are generated by outputting the Ith location of Array_3. The concepts of the present invention will be used to modify the setup process of the above confusion data generator. In this regard, the setup process of the Key array and the three cipher arrays is changed.

The technique of FIG. 6 presents a methodology for the non-linear generation of sub-blocks of cipher bits as a function of multiple cipher arrays acting as state machines. The methodology uses the cipher arrays in a feed forward and feed backward fashion to generate sub-blocks of cipher bits in a non-linear fashion. For each iteration the procedure of FIG. 6 computes an index to a cipher array as a function of the previous value of that index and the current location of all cipher arrays. The procedure then randomizes the cipher array by exchanging the contents of the two locations. The procedure then computes in a non-linear fashion the index of the next sub-block of cipher bits as a function of the two locations. Hence, per iteration all cipher arrays contribute to the randomization process.

The confusion data generator could be used to generate a m=n*w bits stream of cipher bits that could be used with an XOR combiner to encrypt 'm' bits of data. Furthermore, it could also be used in an effective way to minimize the limitation of the XOR combiner. In this regard, the confusion data generator could be used as a 'w' bit encryptor, whereby the lower, middle and upper 'w' bits are XORed together and the result is used to encrypt 'w' bits of data. Similarly, the confusion data generator could be used to encrypt 2*w bits of data whereby, the lower and middle 'w' bits are XORed together and then used with the upper 'w' bits to encrypt the data. Any other combination could also be used. Such modifications give the designer the ability to hide the internal states of the confusion data generator from a cryptanalyst.

The confusion data generator provides a mechanism for generating a confusion data stream that is highly non-linear or complex in nature. Advantages of the confusion data generator include the use of the non-linear mathematical modulo operation to combine the operation of the cipher arrays in a non-linear fashion. The confusion data generator has provided a novel mechanism for developing feed forward and feed backward state machines that are highly non-linear. The confusion data generator overcomes one of the basic limitations of the XOR combiner by developing a confusion data generator that generates a block of "m" bits of confusion data per each iteration that can be used to generate a "k"<"m" bit cipher stream that does not reveal the internal states of the confusion data generator. The confusion data generator results in the ability to design confusion data generators that are scalable, fast and secure.

The modification process associates multiple secret key arrays with the cipher arrays. For instance, a secret key array can be associated with every cipher array. For the analysis, three secret key arrays are used to setup the cipher arrays as opposed to a single key array.

Let the secret key arrays be Key_1, Key_2 and Key_3. The dimension of each secret key array is the same as the dimension of the cipher array and is equal to 'c'=8. A displacement distance into each secret key termed 'Di' (0<i<n) is defined. The displacement distance 'Di' specifies the starting location in the secret key array that is filled by the user seed. The displacement distance 'Di' can be user specified or can be a non-linear function of the number of data items processed by the confusion data generator.

Similarly, a cipher distance displacement 'CDi' is specified to indicate the starting point of the data in each cipher array. The values for the displacement distance 'CDi' can be randomly generated, or user specified or can be computed as a function of the processed plaintext data in a non-linear fashion.

The modification process is better illustrated through the use of an example. For the analysis, use the same user seed {1,2}. Let the secret key displacement distances be 'D1'=1, 'D2'=2 and 'D3'=2. Let the cipher arrays' displacements be 'CD1'=0, 'CD2'=1 and 'CD3'=2.

Figure 7:
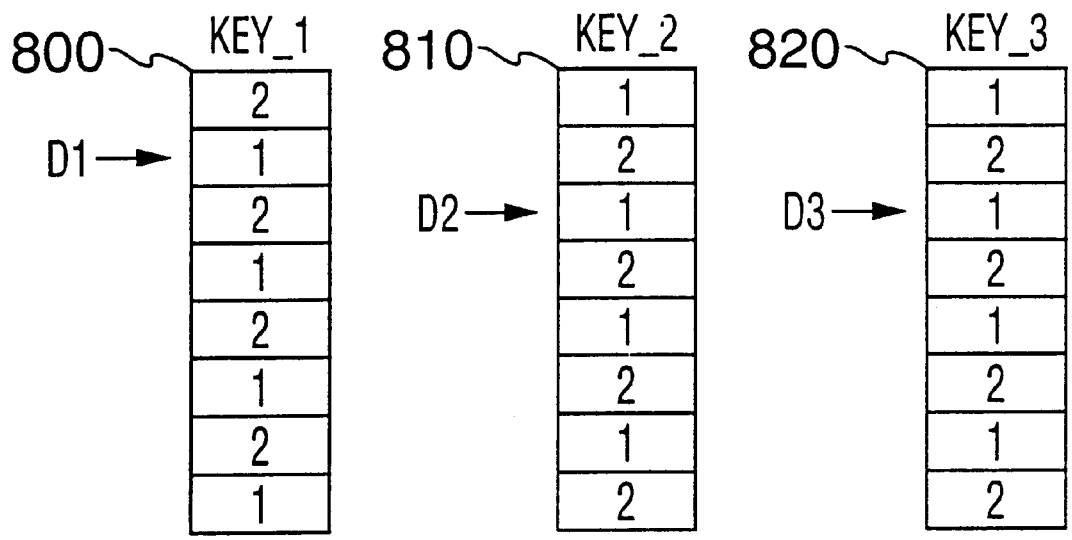
FIG. 7 is a block diagram of the initialization sequence of FIG. 3.

In FIG. 7, the details of initializing the secret key arrays are depicted. In step 800, the secret array Key_1 is initialized with the user seed starting at location 'D1'=1. The seed is replicated to fill all the locations in the array. In step 810, the user seed is used to initialize Key_2 starting at location 'D2'=2. The seed is replicated to fill all the locations in the array. In step 820, the seed is used to fill all the locations of Key_3 starting at location 'D3'=2.

Figure 8:
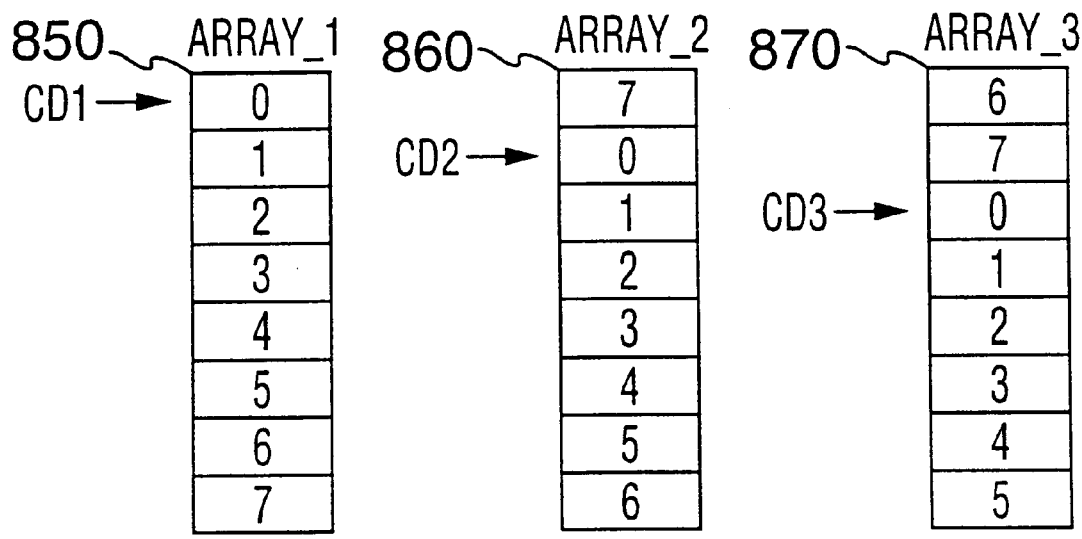
FIG. 8 is a block diagram of the initialization sequence of FIG. 3.

In FIG. 8, the details of initializing the cipher arrays as a function of the displacement distances 'CDi' are depicted. In step 850, cipher array Array_1 is filled with data elements starting at location 'CD1'=0. In step 860, cipher array Array_2 is filled with data elements starting at location 'CD2'=1. In step 870, cipher array Array_3 is filled with data elements starting at location 'CD3'=2.

Figure 9:
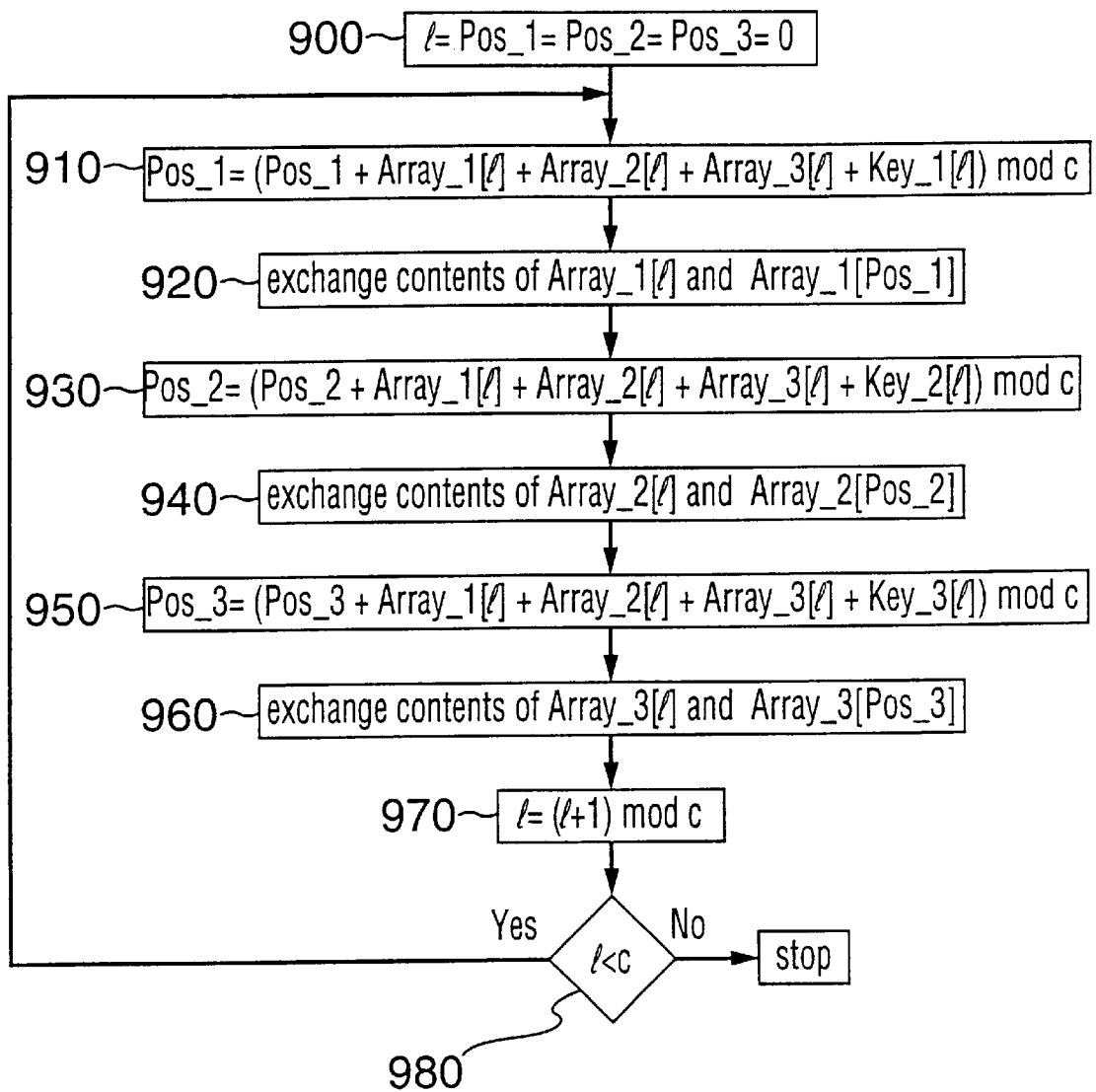
FIG. 9 is a block diagram of the initialization sequence of FIG. 3.

The task of preparing the cipher arrays as depicted in FIG. 4 is also modified. The new process is illustrated in FIG. 9. Steps 970 and 980 ensure that all the elements of the cipher arrays are shuffled. In step 900, the variables '1', 'pos_1', 'pos_2' and 'pos_3' are initialized to zero. In step 910, the new value of 'pos_1' is computed as a function 'Key_1[1]', 'Array_[1]', 'Array_2[1]', 'Array_3[1]' and itself modulo 'c', where 'c' is the dimension of the cipher array. In step 920, the elements in location '1' and 'pos_1' in Array_1 are exchanged. In step 930, the new value of 'pos_2' is computed as a function 'Key_2[1]', 'Array_1[1]', 'Array_2[1]', 'Array_3[1]' and itself modulo 'c', where 'c' is the dimension of the cipher array. In step 940, the elements in location '1' and 'pos_2' in Array_1 are exchanged. In step 950, the new value of 'pos_3' is computed as a function 'Key_3[1]', 'Array_1[1]', 'Array_2[1]', 'Array_3[1]' and itself modulo 'c', where 'c' is the dimension of the cipher array. In step 960, the elements in location '1' and 'pos_3' in Array_1 are exchanged.

For those that are skilled in the art, it is evident that the initialization technique enhances the security of the confusion data generator. The use of multiple secret key arrays that are initialized as a function of the secret key displacement distance Di is equivalent to extending the length of the user seed. In a similar fashion, the use of the cipher distance displacement 'CDi' alone or in combination with the secret key displacement distance 'Di' also enhances the security of the confusion data generator.

The secret Key displacement distance 'Di' and the cipher distance 'CDi' plays an important role in allowing the confusion data generator to generate cipher bits to secure large size data files as a collection of smaller size segments. Basically, during the encryption stage, after processing a certain number of plaintext data elements, the values of 'Di' and (or) 'CDi' are changed. The secret key and the cipher arrays are then re-initialized and the generation of the confusion data is resumed. In this fashion, a given value of the displacement distance 'Di' and (or) 'CDi' encrypt a certain segment of a large plaintext data file. This is equivalent to segmenting a large data file into a collection of smaller segments that are encrypted separately. These smaller segments can be independently decrypted for fast access and review.

The initialization method of the invention gives the designer the ability to hide the internal states of the confusion data generator from a cryptanalyst. The method provides a mechanism for generating a confusion data stream that is complex in nature. The method results in the ability to design confusion data generators that are scalable, secure for applications that require short size secret keys, and capable of securing large size data files as a collection of smaller size segments that could be independently decrypted for fast access and review.

Numerous modifications, variations and adaptations may be made to the particular embodiments of the invention described above without departing from the scope of the invention, which is defined in the claims.

I claim:

1. An initializer for a confusion data generator comprising:
   a first key array comprising a series of data elements, each data element having a value;
   a first key displacement index having a value corresponding to a data element in the first_key_array;
   a first cipher array comprising a series of data elements, each data element having a value;
   a first index having a value corresponding to a data element in the first cipher array;
   means for initializing the first key array with a user specified seed as a function of the first displacement index; and
   for each data element in the first cipher array, means for computing in a non-linear fashion the value of the first index as a function of the value of such data element in the first cipher array and the value of a corresponding data element in the first key array, and means for exchanging the value of such data element in the first cipher array with the value of the data element in the first cipher array corresponding to the value of the first index.

2. An initializer for a confusion data generator comprising:
   a first key array comprising a series of data elements, each data element having a value;
   a first key displacement index having a value corresponding to a data element in the first key array;
   a second key array comprising a series of data elements, each data element having a value;
   a second key displacement index having a value corresponding to a data element in the second array;
   a first cipher array comprising a series of data elements, each data element having a value;
   a first index having a value corresponding to a data element in the first cipher array;
   a first cipher displacement index having a value corresponding to a data element in the first cipher array;
   a second cipher array comprising a series of data elements, each data element having a value;
   a second index having a value corresponding to a data element in the second cipher array;
   a second cipher displacement index having a value corresponding to a data element in the second cipher array;
   means for initializing the first key array with a user specified seed as a function of the first displacement index;
   means for initializing the second key array with a user specified seed as a function of the second displacement index;
   means for initializing the first cipher array as a function of the first cipher displacement index;
   means for initializing the second cipher array as a function of the second cipher displacement index;
   for each data element in the first cipher array, means for computing in a non-linear fashion the value of the first index as a function of the value of such data element in the first cipher and the value of a corresponding data element in the first key array, and means for exchanging the value of such data element in the first cipher array with the value of the data element in the first cipher array corresponding to the value of the first index;
   for each data element in the second cipher array, means for computing in a non-linear fashion the value of the second index as a function of the value of such data element in the second cipher array, the value of a corresponding data element in the first cipher array, and the value of a corresponding data element in the second key array, and means for exchanging the value of such data element in the second array with the value of the data element in the first array corresponding to the value of the second index.

3. An apparatus for encrypting data comprising:
   (a) means for initialising a confusion data generator comprising feed-back and feed-forward of data means between a number of arrays and the use of at least one secret key;
   (b) Means for generating a segment of confusion data;
   (c) Means for combining the segment of confusion data and a segment of data with a combiner to create a segment of encrypted data; and
   (d) Means for re-initialising the confusion data generator.

4. A method for initializing a confusion data generator with an initializer comprising: a first key array comprising a series of data elements, each data element having a value; a first key displacement index having a value corresponding to a data element in the first_key_array; a first cipher array comprising a series of data elements, each data element having a value; a first index having a value corresponding to a data element in the first cipher array; the method comprising the steps of:
   initializing the first key array with a user specified seed as a function of the first displacement index; and
   for each data element in the first cipher array, computing in a non-linear fashion the value of the first index as a function of the value of such data element in the first cipher array and the value of a corresponding data element in the first key array, and exchanging the value of such data element in the first cipher array with the value of the data element in the first cipher array corresponding to the value of the first index.

5. A method for initializing a confusion data generator with an initializer comprising: a first key array comprising a series of data elements, each data element having a value; a first key displacement index having a value corresponding to a data element in the first key array; a second key array comprising a series of data elements, each data element having a value; a second key displacement index having a value corresponding to a data element in the second array; a first cipher array comprising a series of data elements, each data element having a value; a first index having a value corresponding to a data element in the first cipher array; a first cipher displacement index having a value corresponding to a data element in the first cipher array; a second cipher array comprising a series of data elements, each data element having a value; a second index having a value corresponding to a data element in the second cipher array; a second cipher displacement index having a value corresponding to a data element in the second cipher array; the method comprising the steps of:
   initializing the first key array with a user specified seed as a function of the first displacement index;
   initializing the second key array with a user specified seed as a function of the second displacement index;

initializing the first cipher array as a function of the first cipher displacement index;

initializing the second cipher array as a function of the second cipher displacement index;

for each data element in the first cipher array, computing in a non-linear fashion the value of the first index as a function of the value of such data element in the first cipher and the value of a corresponding data element in the first key array, and exchanging the value of such data element in the first cipher array with the value of the data element in the first cipher array corresponding to the value of the first index; and for each data element in the second cipher array, computing in a non-linear fashion the value of the second index as a function of the value of such data element in the second cipher array, the value of a corresponding data element in the first cipher array, and the value of a corresponding data element in the second key array, and exchanging the value of such data element in the second array with the value of the data element in the first array corresponding to the value of the second index.

6. An method for encrypting data comprising the steps of:

(a) initialising a confusion data generator which uses feed-back and feed-forward of data between a number of arrays, and at least one secret key;

(b) generating a segment of confusion data;

(c) combining the segment of confusion data and a segment of data with a combiner to create a segment of encrypted data;

(d) re-initialising the confusion data generator; and (e) repeating steps (a) to (d) for the remaining data.

* * * * *